United States Patent
Kakiel et al.

(10) Patent No.: US 10,418,604 B2
(45) Date of Patent: Sep. 17, 2019

(54) BATTERY CARRIER FOR BATTERY OF PORTABLE COMMUNICATION DEVICE

(71) Applicant: MOTOROLA SOLUTIONS, INC., Chicago, IL (US)

(72) Inventors: Anthony M. Kakiel, Coral Springs, FL (US); Gary A. Lee, Weston, FL (US); Ido Amit, Boynton Beach, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 265 days.

(21) Appl. No.: 15/623,040

(22) Filed: Jun. 14, 2017

(65) Prior Publication Data
US 2018/0366696 A1    Dec. 20, 2018

(51) Int. Cl.
| | |
|---|---|
| *H01M 2/10* | (2006.01) |
| *A45F 5/02* | (2006.01) |
| *A45F 5/00* | (2006.01) |
| *B08B 1/00* | (2006.01) |
| *H01R 43/00* | (2006.01) |

(52) U.S. Cl.
CPC ............ *H01M 2/1061* (2013.01); *A45F 5/00* (2013.01); *H01M 2/1066* (2013.01); *H01M 2/1094* (2013.01); *A45F 5/021* (2013.01); *A45F 2005/002* (2013.01); *B08B 1/006* (2013.01); *H01M 2220/30* (2013.01); *H01R 43/002* (2013.01); *Y10S 224/902* (2013.01)

(58) Field of Classification Search
CPC .. Y10S 224/902; A45F 5/021; H01M 2/1005; H01M 2/1061; H01M 2/1066; H01M 2200/30
See application file for complete search history.

(56) References Cited

U.S. PATENT DOCUMENTS

| | | | | | |
|---|---|---|---|---|---|
| 1,713,413 | A | * | 5/1929 | Yenerall | A45F 5/02 224/256 |
| 1,723,147 | A | * | 8/1929 | Fourethier | A45F 5/00 224/197 |
| 1,779,207 | A | * | 10/1930 | Candar | H01M 2/1005 206/703 |
| 2,096,376 | A | * | 10/1937 | Lauppe | A45F 5/00 224/240 |
| 2,190,601 | A | * | 2/1940 | La Van | H01M 2/1005 224/256 |
| 5,251,800 | A | * | 10/1993 | Leenders | A45F 5/02 224/245 |

(Continued)

OTHER PUBLICATIONS

Photographs of battery holsters, 1 page (At least as early as Mar. 20, 2017).
Photographs of cell pack chargers, 1 page (At least as early as Mar. 20, 2017).

*Primary Examiner* — Justin M Larson
(74) *Attorney, Agent, or Firm* — Michael Best & Friedrich LLP

(57) ABSTRACT

A method and apparatus for carrying a battery of a portable communication device. The battery carrier includes a body, a carrier sealing surface, and a wiper. The carrier sealing surface engages a battery seal while the battery is positioned in the battery carrier. The wiper is positioned on a support surface of a battery receptacle in the body. The wiper is aligned with battery contacts of the battery. The wiper wipes the electrical contacts when the battery is inserted into the battery receptacle.

18 Claims, 12 Drawing Sheets

(56) References Cited

U.S. PATENT DOCUMENTS

| | | | |
|---|---|---|---|
| 5,528,770 A * | 6/1996 | Castilla | A45F 5/02 224/269 |
| 5,768,371 A | 6/1998 | Snyder | |
| 6,184,654 B1 | 2/2001 | Bachner, III et al. | |
| 6,411,062 B1 | 6/2002 | Baranowski et al. | |
| 6,939,641 B2 | 9/2005 | Kincaid et al. | |
| 8,367,235 B2 | 2/2013 | Huang | |
| 9,711,765 B1 * | 7/2017 | Ladd | H01M 2/1022 |
| 2018/0366696 A1 * | 12/2018 | Kakiel | H01M 2/1061 |

* cited by examiner

BATTERY CARRIER FOR BATTERY OF PORTABLE COMMUNICATION DEVICE

BACKGROUND OF THE INVENTION

Operators of battery-powered communication devices, such as mobile telephones and two-way radios, often carry a spare battery in the event that the battery in use becomes discharged. It is common for an operator to carry a spare battery in an environment that contains dirt or debris, such as a clothes pocket. The battery contacts may become contaminated, potentially disrupting the electrical connection between the battery contacts and corresponding electrical contacts of the portable communication device. In addition, some batteries include a body which also acts as a door for the portable communication device. The door includes a seal that protects the internal components of the device from water. This seal may also become contaminated or damaged if the battery is carried in a dirty environment, which may compromise the battery's leak performance.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
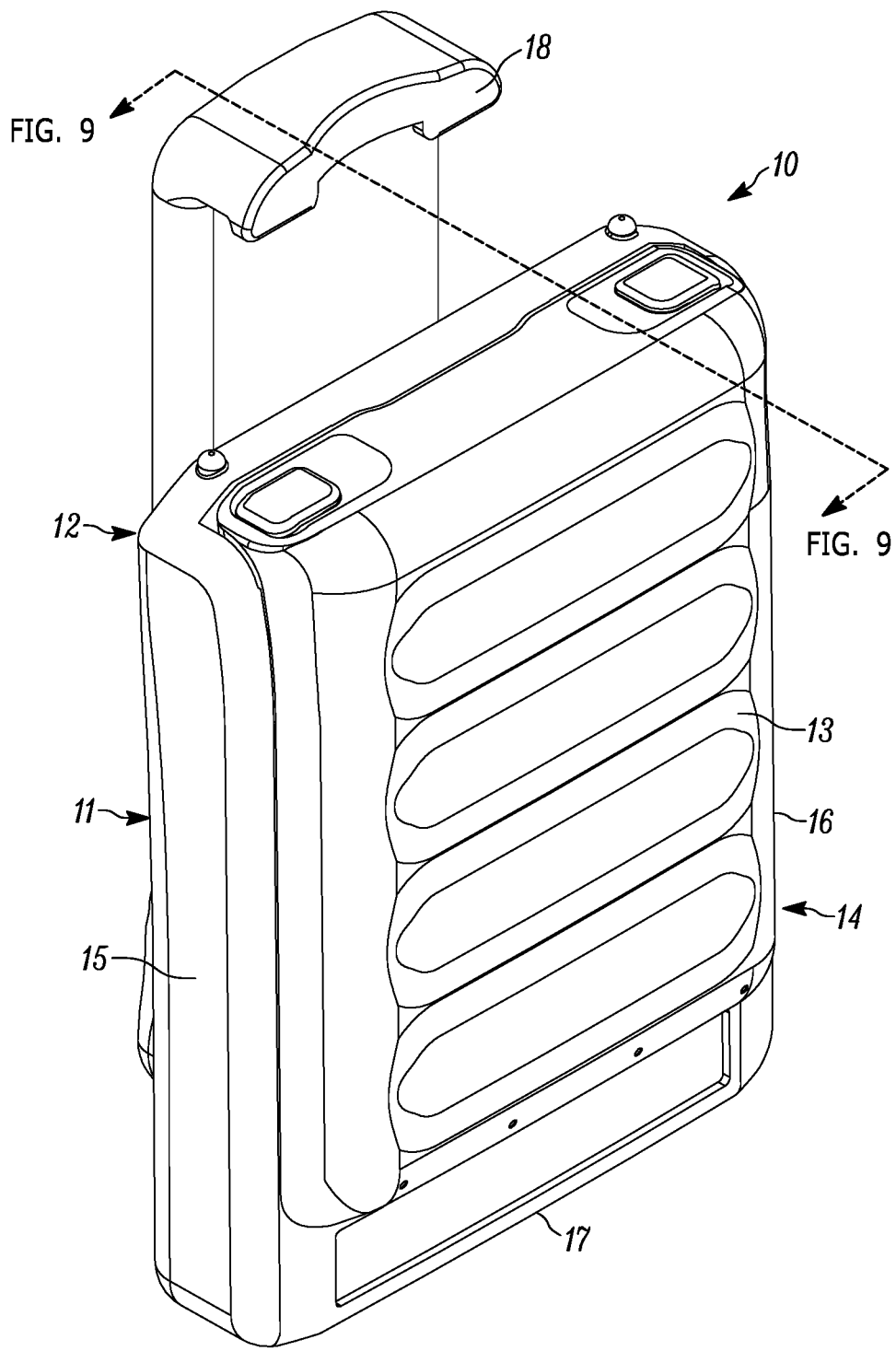
FIG. 1 is a front perspective view of the battery carrier and battery assembly in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a battery carrier that is configured to releasably support a battery of a portable communication device. The battery carrier includes a body having a carrier sealing surface that is sized and shaped to engage a battery seal. The body also includes a wiper that is configured to be aligned with and contact a plurality of electrical contacts of the battery when the battery is supported by the battery carrier.

Another embodiment provides a battery carrying system comprising a battery having a plurality of electrical contacts and a battery seal configured to at least partially seal a battery compartment of a portable communication device. The battery carrier is configured to releasably support the battery. The battery carrier includes: a body having a sealing surface that is sized and shaped to engage the battery seal; and a wiper interconnected with the body and configured to be aligned with and to contact the plurality of electrical contacts when the battery is supported by the body.

Yet another embodiment provides a method of supporting a battery for a portable communication device using a battery carrier, where the battery has a plurality of electrical contacts and a battery seal. The method includes engaging the battery with a body of the battery carrier; supporting the battery seal with a carrier sealing surface interconnected with the body; and wiping the plurality of electrical contacts with a wiper interconnected with the body while the battery is engaging the body of the battery carrier.

FIG. 1 provides a front view of an assembly 10 that includes a battery carrier 11. The battery carrier 11 includes a body 12. Located in the body 12 is a door 13 of a portable electronic device, which is discussed below. As will also be discussed below, the door 13 includes a battery. The door 13 and battery form a battery assembly 14. The body 12 includes a plurality of sides 15, 16, and 17.

Figure 2:
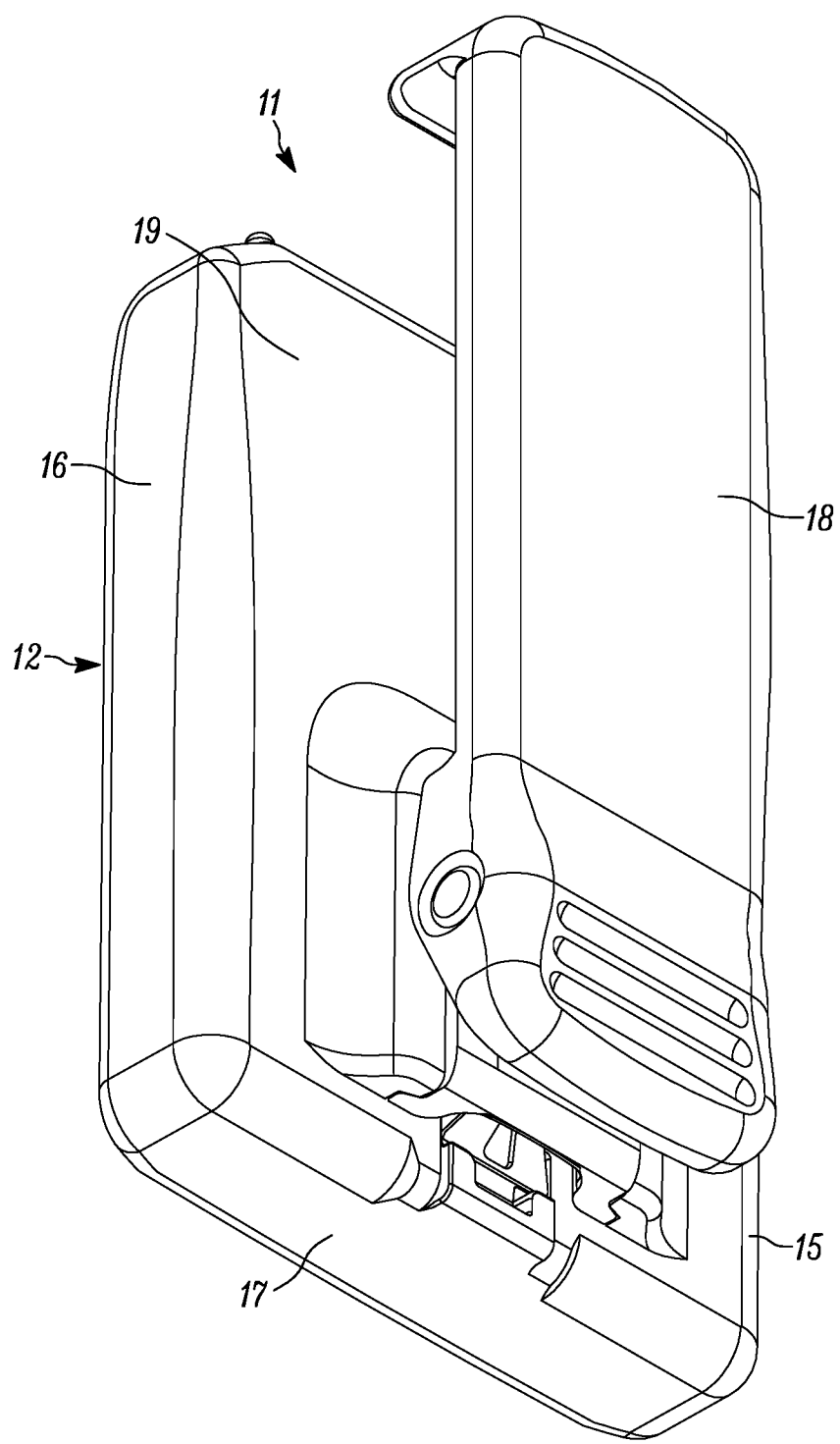
FIG. 2 is a rear perspective view of the battery carrier and battery assembly in accordance with some embodiments.

FIG. 2 provides a rear view of the assembly 10. In the example illustrated, the assembly 10 also includes a belt clip 18 attached to or otherwise interconnected with a rear surface 19 of assembly 10. The belt clip 18 is configured to engage a belt of a user, for example, a first responder.

Figure 3:
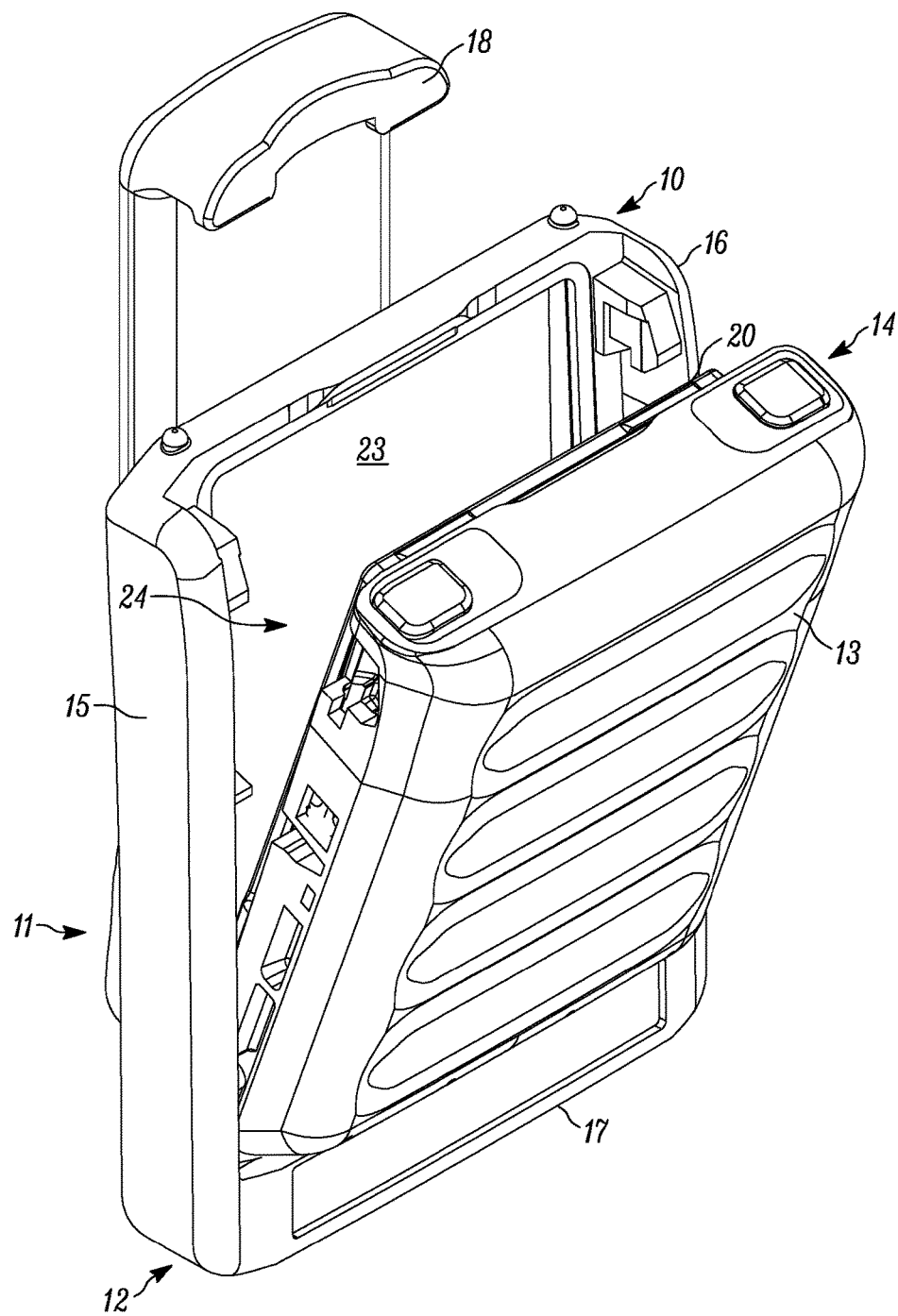
FIG. 3 is a front perspective view depicting the battery assembly being inserted into the battery carrier in accordance with some embodiments.

FIG. 3 provides a front view of the assembly 10 depicting the battery assembly 14 being inserted into the battery carrier 11. FIG. 3 illustrates a portion of a battery 20 that forms the battery assembly 14 with the door 13. The battery carrier 11 is configured to releasably support and carry a battery and, in the example shown, to carry the battery assembly 14. As shown in FIG. 3, the plurality of sides 15, 16, and 17, and a support surface 23 together form a receptacle 24 configured to receive the battery assembly 14. The battery assembly 14 may be inserted into and removed from the receptacle 24 by, for example, a manual operation performed by a user. Since the door 13 and battery 20 are part of a single assembly, when the door 13 is removed from the battery carrier 11, the battery 20 is also removed from the battery carrier.

Figure 4:
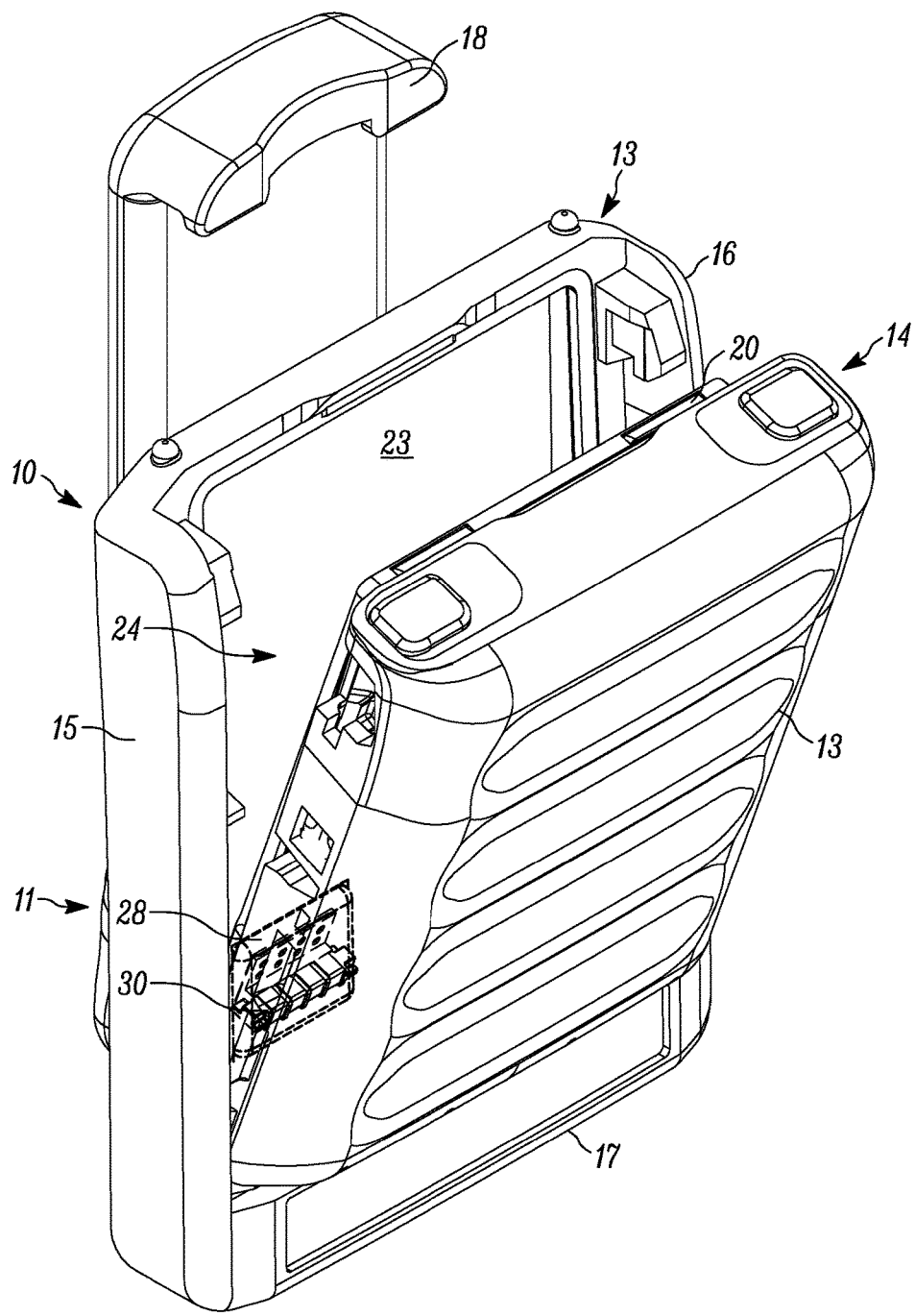
FIG. 4 is a front perspective view depicting aligning of a wiper of the battery carrier and battery contacts in accordance with some embodiments.
Figure 7:
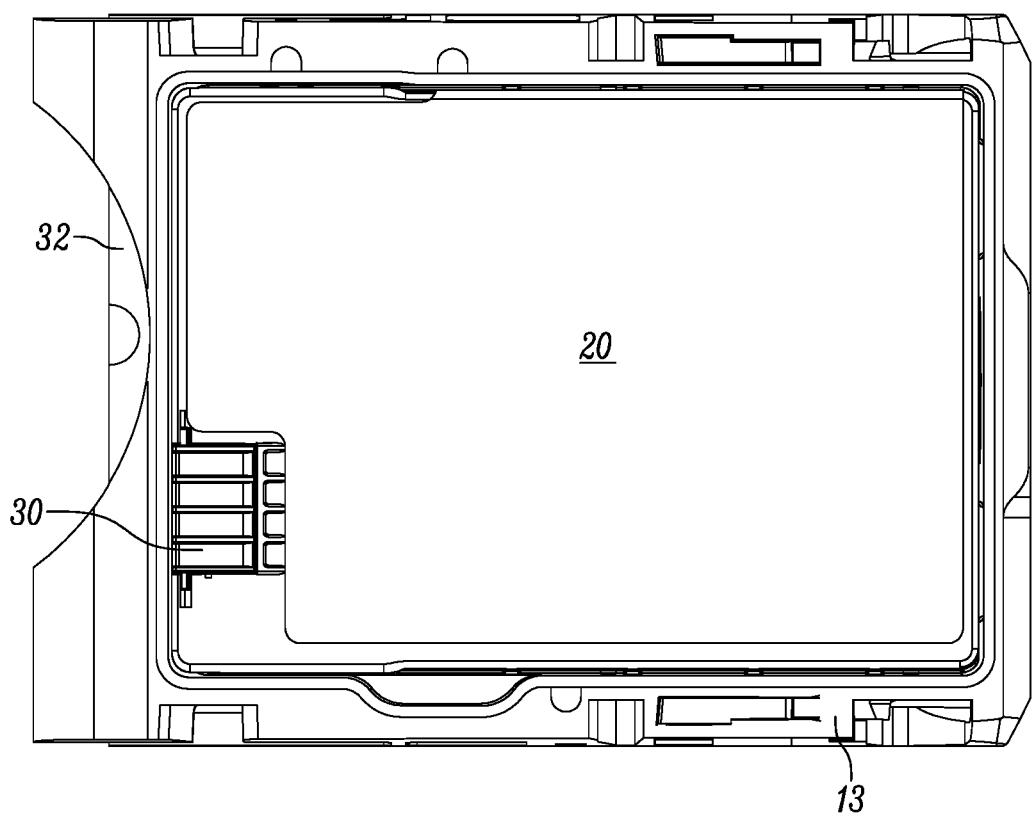
FIG. 7 is a top plan view of the battery and door in accordance with some embodiments.
Figure 8:
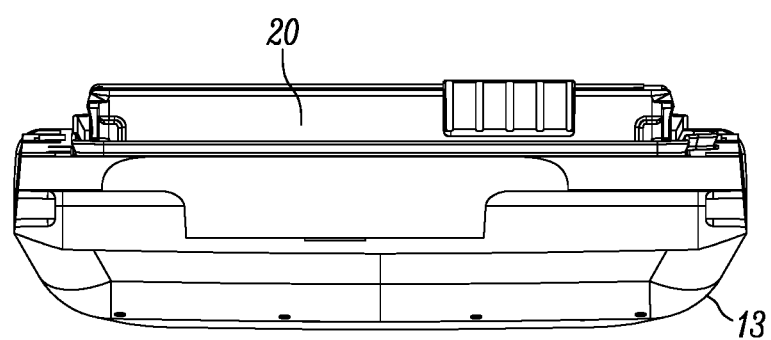
FIG. 8 is an end view of the battery and door in accordance with some embodiments.
Figure 9:
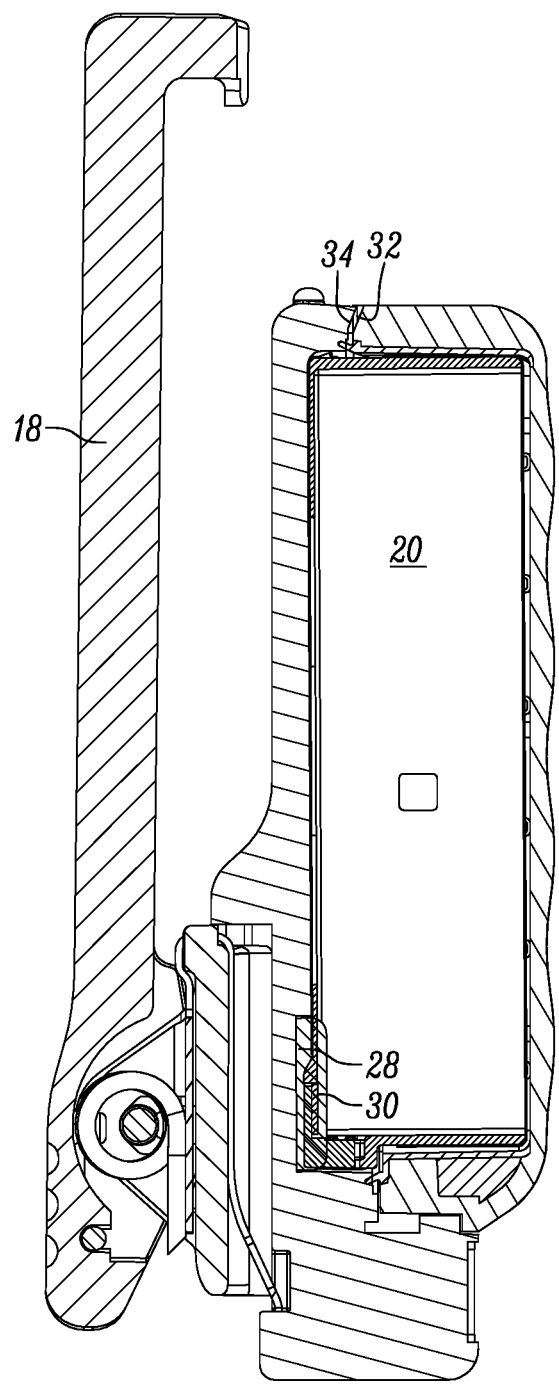
FIG. 9 is a cross-sectional side view of the battery carrier, battery and door assembly, taken along plane 9-9 of FIG. 1, in accordance with some embodiments.
Figure 11:
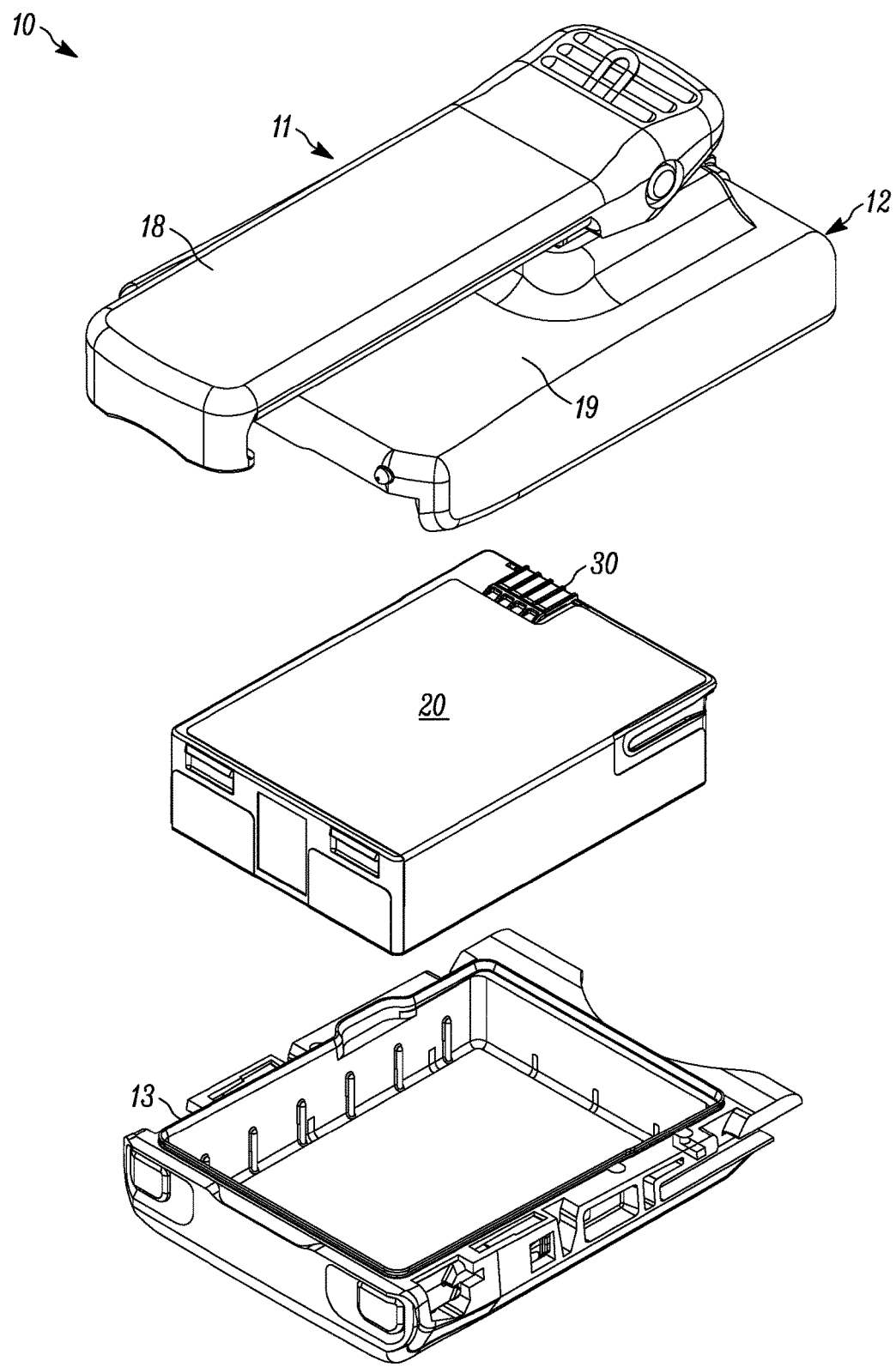
FIG. 11 is a rear exploded perspective view of the batter carrier, battery and door assembly in accordance with some embodiments.

FIG. 4 illustrates how a wiper and electrical contacts of the battery 20 may be aligned in some embodiments. A wiper 28 (shown in dashed lines in FIG. 4) is located within the receptacle 24 and mounted on or otherwise interconnected with the support surface 23 of the battery carrier 11. The wiper 28 is sized, shaped, positioned, and otherwise configured to be aligned with and contact a plurality of electrical contacts 30 of battery 20 when the battery assembly 14 is supported by body 12 of battery carrier 11. This is also shown in FIGS. 7, 9, and 11. Of course, when the battery assembly 14 is supported by the body 12 of the battery carrier 11, the battery 20 is also supported by the body 12 of the battery carrier 11.

Figure 5:
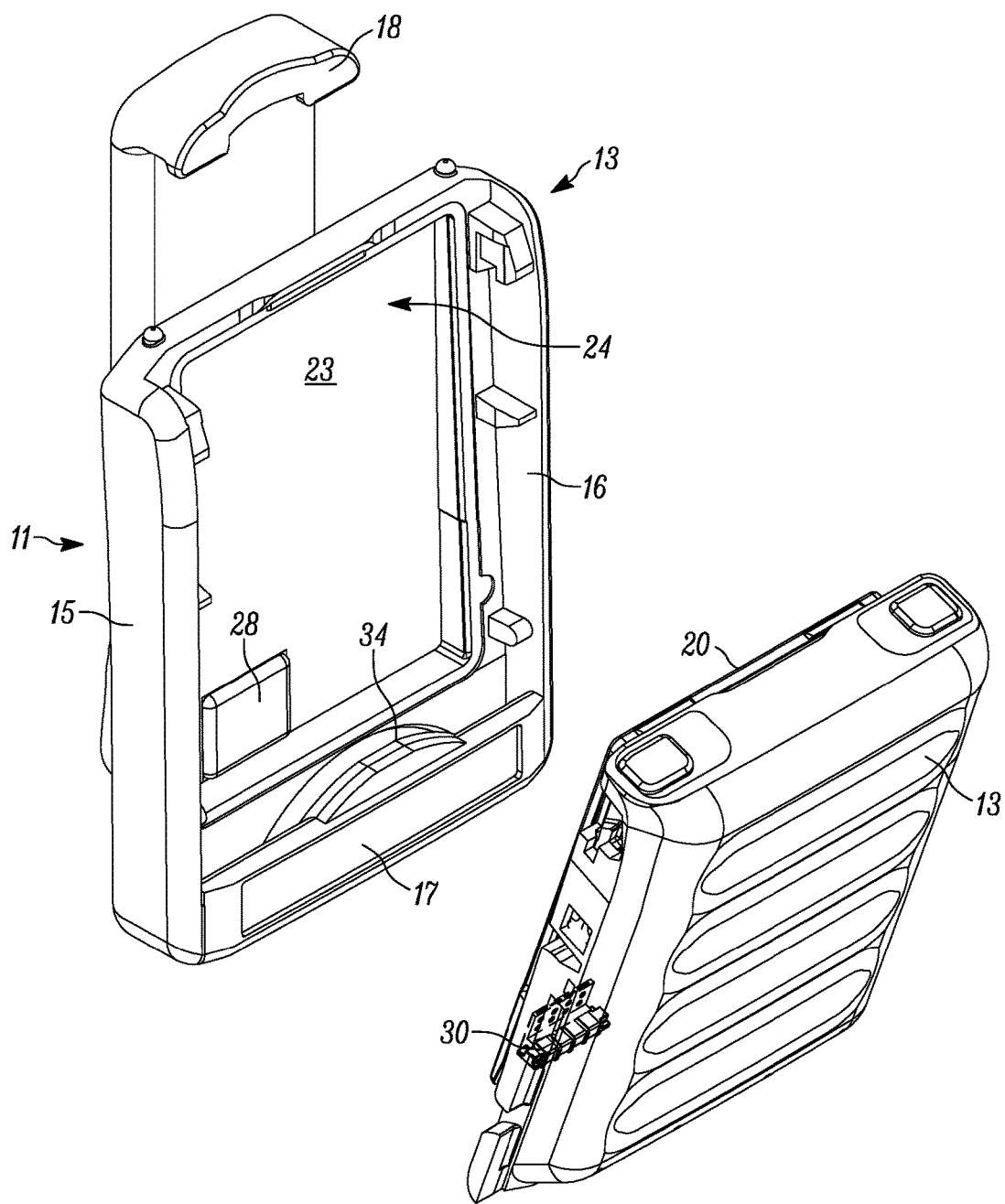
FIG. 5 is an exploded view of the battery assembly and the battery carrier in accordance with some embodiments.
Figure 10:
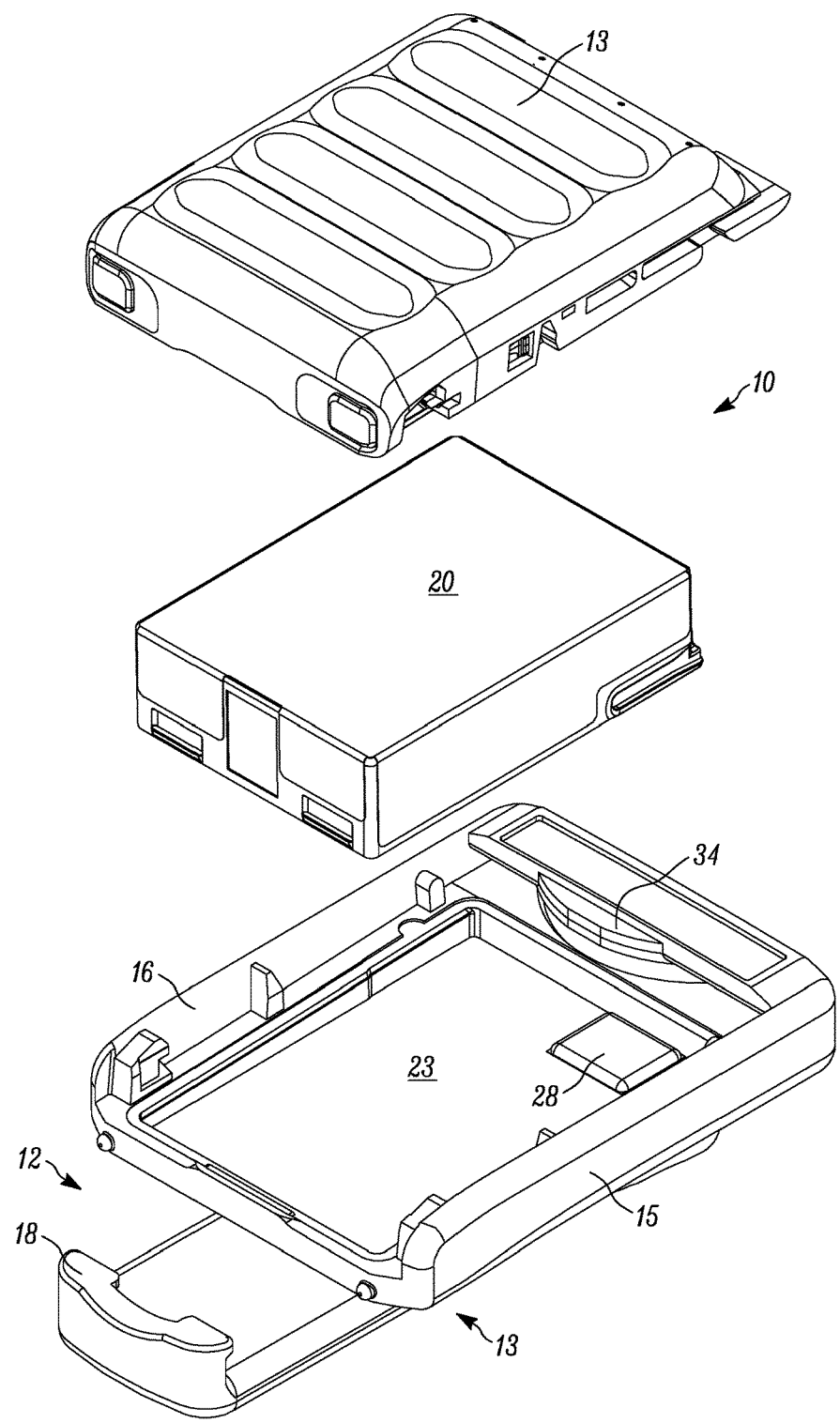
FIG. 10 is an exploded front perspective view of the battery carrier, battery and door assembly in accordance with some embodiments.

FIGS. 5 and 10 also illustrate how the wiper 28 is interconnected with the support surface 23 of the body 12 of the battery carrier 11. The electrical contacts 30 are also shown in FIGS. 4, 7, 9 and 11. For example, FIG. 9 illustrates wiper 28 engaging electrical contacts 30 of battery 20 when battery 20 is disposed in receptacle 24 of body 12.

Referring again to FIGS. 4, 5 and 10, wiper 28 may be made of a lint-free material whose constituents do not readily separate. For example, the wiper 28 may be made from rubber. In some embodiments, wiper 28 may be impregnated with at least one of a lubricant and a solvent. One lubricant that it suitable for use with some embodiments is ProGold™ lubricant available from ProGold Manufacturing of Atlanta, Ga.

Wiper 28 wipes the plurality of electrical contacts 30 while the battery 20 is engaging or being inserted into body 12 of the battery carrier 11. The wiping action helps clean the electrical contacts 30 (for example, remove debris from the electrical contacts 30). If the wiper 28 is impregnated with a lubricant or solvent, the wiping action also applies the solvent or lubricant to the electrical contacts 30 (thereby lubricating them). The solvent may help remove dirt and debris. The lubricant may reduce friction and improve mechanical connections between the electrical contacts 30 of the battery and electrical contacts (not shown) of the portable communications device 17. Thus, the wiper 28 removes dirt and debris that may be disposed on electrical contacts 30, may apply a solvent or lubricant to the electrical contacts 30, and through one or both of these actions improve the electrical connection between battery 20 and the portable communication device.

Figure 6:
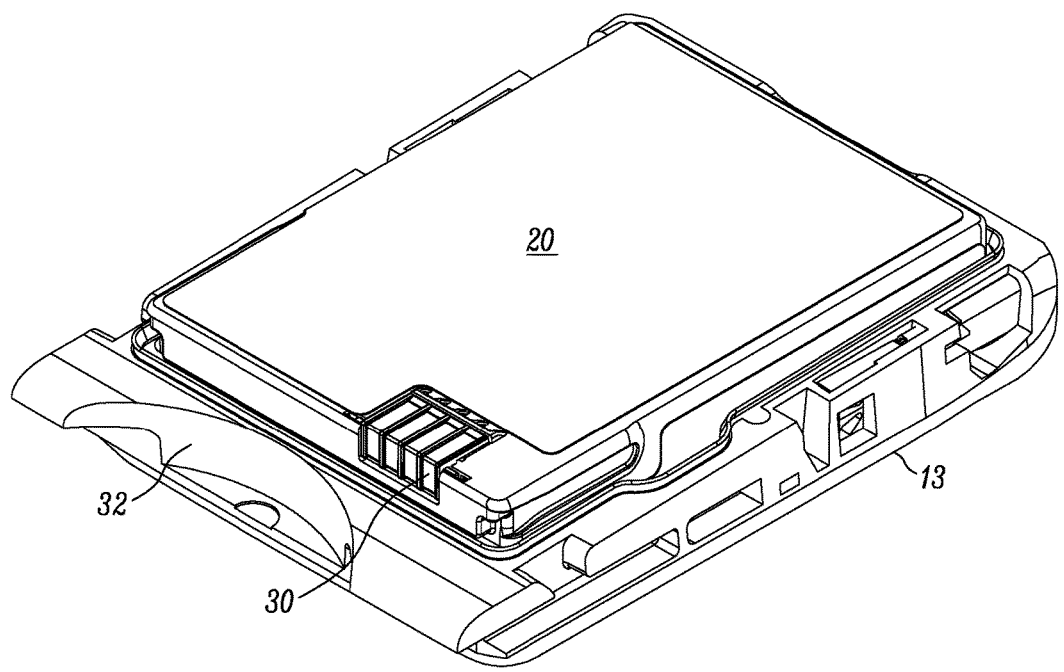
FIG. 6 is a rear perspective view of the battery and door in accordance with some embodiments.
Figure 12:
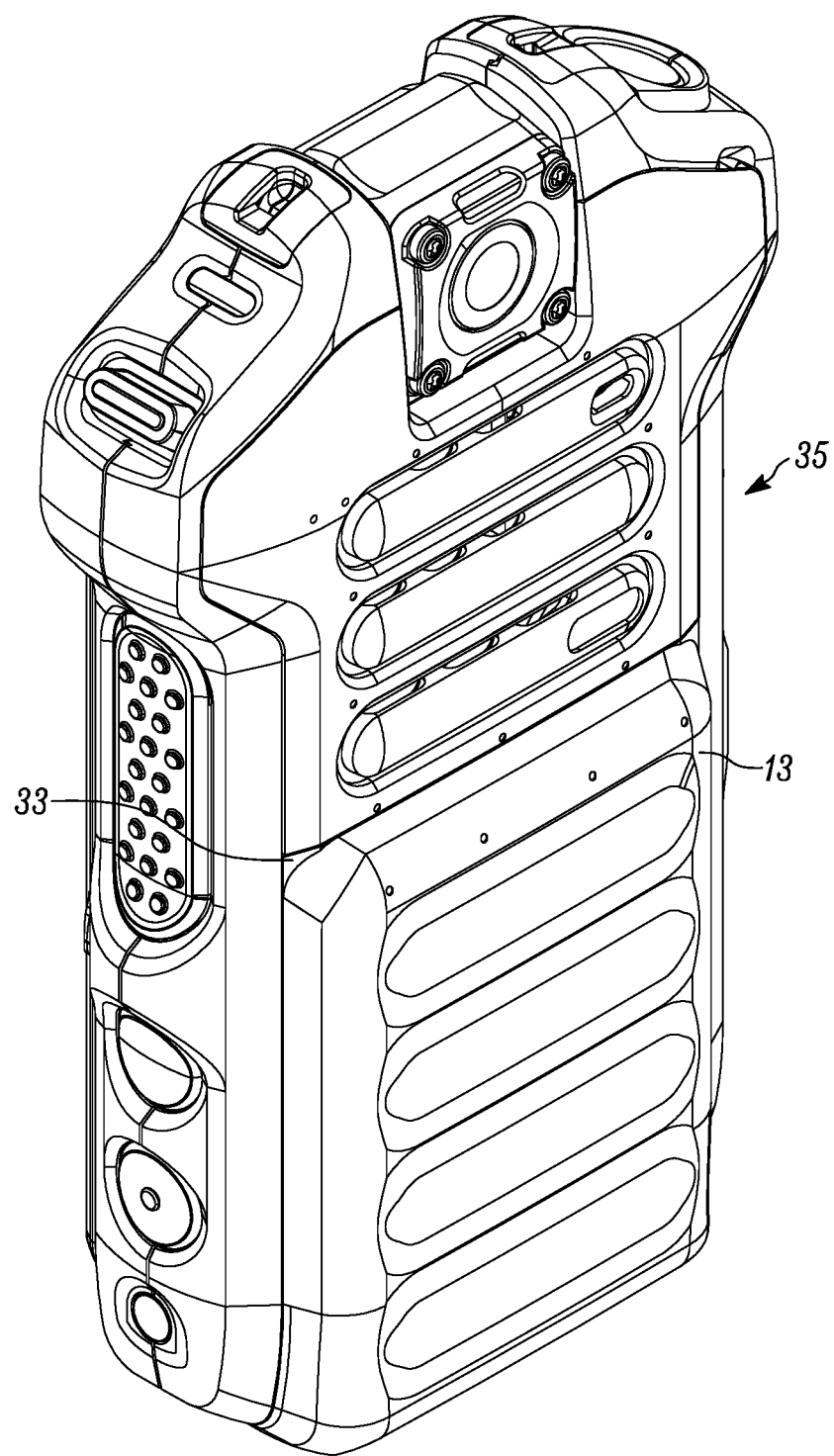
FIG. 12 is a front perspective view of a portable communication device including the battery and door in accordance with some embodiments.

As best shown in FIGS. 6 and 7, door 13 has positioned thereon a battery seal 32. The battery seal 32 has two uses. First, the battery seal 32 is used to seal a battery compartment 33 and the door 13 of a portable communication device 35 (FIG. 12). The battery seal 32 helps to make the battery compartment 33 resistant to water and debris infiltration. As shown in FIGS. 9 and 10 when the battery assembly 14 is located in the receptacle 24, the battery seal 32 is positioned to engage a carrier sealing surface 34 of the battery carrier 11. As may be seen by reference to FIGS. 9 and 10, the carrier sealing surface 34 is interconnected with body 12 of battery carrier 11. Carrier sealing surface 34 is sized and shaped to engage the battery seal 32 of door 13, as best shown in FIG. 5 and in the cross-sectional view of FIG. 9. The carrier sealing surface 34 supports and protects battery seal 32 while the battery 20 and door 13 (as the battery assembly 14) engage body 12 of battery carrier 11.

FIGS. 10 and 11 are exploded views of assembly 10 illustrating battery 20, door 13, and the body 12 of battery carrier 11.

FIG. 12 illustrates the portable communication device 35 in the form of a two-way radio. In other embodiments, the portable communication device 35 may be a smart telephone, a tablet computer, a digital audio player, or other battery-powered electronic device. In the example shown, the battery 20 and door 13 have been installed in the battery compartment 33 of the portable communication device 35.

It should be noted that only some portable communication devices have a battery 20 that includes a door attached to the battery, as shown in FIG. 12. In other devices, the battery is not attached or otherwise associated with a door.

The power requirements of some portable communication devices during use (for example, during a work shift of a first responder) may exceed the capacity of a single battery. In such cases, a user may carry an extra battery in the battery carrier 11 for his her portable communication device by affixing the assembly 10 to the user's belt with the belt clip 18.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A battery carrier configured to releasably support a battery, the battery carrier comprising:
   a body having a carrier sealing surface that is sized and shaped to engage a battery seal of the battery; and
   a wiper interconnected with the body and configured to be aligned with and to contact a plurality of electrical contacts of the battery when the battery is supported by the body.

2. The battery carrier of claim 1, wherein the body of the battery carrier further comprises a receptacle configured to receive the battery.

3. The battery carrier of claim 2, wherein the receptacle comprises a plurality of sides and a support surface, and wherein the wiper is interconnected with the support surface.

4. The battery carrier of claim 1, wherein the wiper is made of a lint-free material whose constituents do not readily separate.

5. The battery carrier of claim 1, wherein the wiper includes at least one of a lubricant and a solvent.

6. The battery carrier of claim 1, further comprising:
   a clip interconnected with the body, the clip configured to engage a belt of a user.

7. The battery carrier of claim 1, wherein the battery carrier is configured to releasably support a battery of a portable communication device.

8. A battery carrying system comprising:
   a battery having a plurality of electrical contacts and a battery seal configured to at least partially seal a battery compartment of a portable communication device;
   a battery carrier configured to releasably support the battery, the battery carrier including
      a body having a sealing surface that is sized and shaped to engage the battery seal; and
      a wiper interconnected with the body and configured to be aligned with and to contact the plurality of electrical contacts when the battery is supported by the body.

9. The battery carrying system of claim 8, wherein the battery includes a door for a portable communication device, and wherein the battery seal is positioned on the door.

10. The battery carrying system of claim 8, wherein the body of the battery carrier further comprises a receptacle configured to receive the battery.

11. The battery carrying system of claim 10, wherein the receptacle comprises a plurality of sides and a support surface, and wherein the wiper is positioned on the support surface.

12. The battery carrying system of claim 8, wherein the wiper is made of a lint-free material.

13. The battery carrying system of claim 8, wherein the wiper is impregnated with a lubricant or a solvent.

14. The battery carrying system of claim 8, further comprising a belt clip interconnected with the body.

15. A method of supporting a battery using a battery carrier, the battery having a plurality of electrical contacts and a battery seal, the method comprising:
   engaging the battery with a body of the battery carrier;
   supporting the battery seal with a carrier sealing surface interconnected with the body; and
   wiping the plurality of electrical contacts with a wiper interconnected with the body while the battery is engaging the body of the battery carrier.

16. The method of claim 15, wherein the wiping includes:
   cleaning the plurality of electrical contacts of the battery with a solvent impregnated in the wiper while the battery is engaging the body of the battery carrier.

17. The method of claim 15, wherein the wiping includes:
   lubricating the plurality of electrical contacts of the battery with a lubricant impregnated in the wiper while the battery is engaging the body of the battery carrier.

18. The method of claim 15, further comprising:
   configuring the battery for use in a portable communication device.

* * * * *